(12) United States Patent
Liao et al.

(10) Patent No.: US 12,524,052 B2
(45) Date of Patent: Jan. 13, 2026

(54) POWER SUPPLY UNIT CAGE WITH A DOUBLE SWITCH PROTECTION TO PREVENT INSERTION OF AN IMPROPER SIZED POWER SUPPLY UNIT

(71) Applicant: DELL PRODUCTS L.P., Round Rock, TX (US)

(72) Inventors: Te Ming Liao, Taipei (TW); Tingchun Kuo, Taipei (TW); Yen-Hsing Lin, Taipei (TW)

(73) Assignee: Dell Products L.P., Round Rock, TX (US)

( * ) Notice: Subject to any disclaimer, the term of this patent is extended or adjusted under 35 U.S.C. 154(b) by 148 days.

(21) Appl. No.: 18/426,478

(22) Filed: Jan. 30, 2024

(65) Prior Publication Data

US 2025/0244810 A1 Jul. 31, 2025

(51) Int. Cl.
*G06F 1/26* (2006.01)
*G06F 1/18* (2006.01)

(52) U.S. Cl.
CPC .............. *G06F 1/263* (2013.01); *G06F 1/189* (2013.01)

(58) Field of Classification Search
CPC ................................. G06F 1/263; G06F 1/189
See application file for complete search history.

(56) References Cited

U.S. PATENT DOCUMENTS

| | | | | |
|---|---|---|---|---|
| 4,718,858 | A * | 1/1988 | Godfrey | G06F 1/181 |
| | | | | 361/732 |
| 11,163,343 | B1 * | 11/2021 | Lin | G06F 1/188 |
| 11,177,088 | B2 * | 11/2021 | Tyleshevski | H02B 1/36 |
| 2010/0017628 | A1 | 1/2010 | Chen et al. | |
| 2015/0277516 | A1 * | 10/2015 | Farrow | G06F 1/181 |
| | | | | 361/679.48 |

* cited by examiner

*Primary Examiner* — David D Davis
(74) *Attorney, Agent, or Firm* — Larson Newman, LLP

(57) ABSTRACT

A power supply system includes a power supply cage, a first switch arm, and a second switch arm. The first and second switch arms cross above the power supply cage. Each of the first and second switch arms includes a respective switch portion and a respective stopper portion. When an improper sized power supply unit is inserted within the power supply cage, the stopper portion of at least one of the first and second switch arms remain within the power supply cage. In this situation, the stopper portion prevents the power supply unit from being fully inserted within the power supply system when the power supply unit is the improper size.

20 Claims, 12 Drawing Sheets

POWER SUPPLY UNIT CAGE WITH A DOUBLE SWITCH PROTECTION TO PREVENT INSERTION OF AN IMPROPER SIZED POWER SUPPLY UNIT

FIELD OF THE DISCLOSURE

The present disclosure generally relates to information handling systems, and more particularly relates to a power supply unit with double switch protection.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A power supply system includes a power supply cage, a first switch arm, and a second switch arm. The power supply cage includes a top panel, and the top panel has first and second edges. The first switch arm includes a first switch portion, a first stopper portion, and a first arm portion. The first switch portion is located near the first edge of the top panel. The first stopper portion located near the second edge. The first arm portion extends between the first switch portion and the first stopper portion. The second switch arm includes a second switch portion, a second stopper portion, a second arm portion, and a raised arm portion. The second switch portion is located near the second edge. The second stopper portion is located near the first edge. The second arm portion extends between the second switch portion and the second stopper portion. The raised arm portion that overlaps the first arm portion of the first switch arm.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
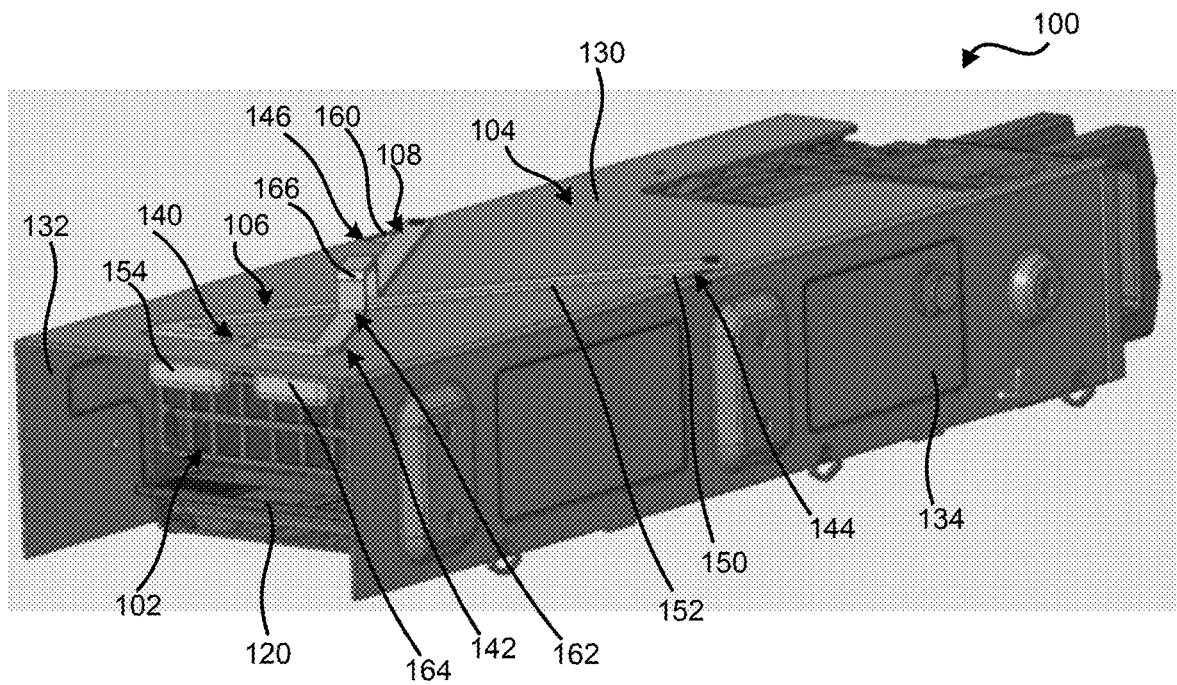
FIGS. 1 and 2 are perspective views of a power supply system for an information handling system according to at least one embodiment of the present disclosure.
Figure 2:
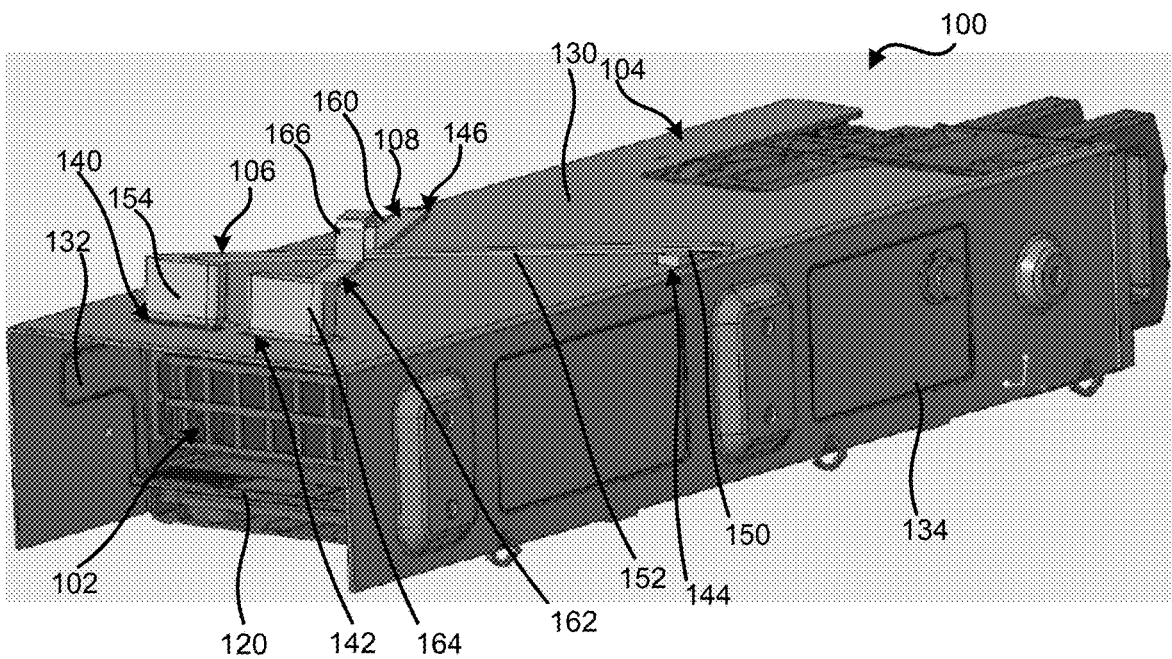

FIGS. 1 and 2 illustrate a power supply system 100 for an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Power supply system 100 includes a power supply unit 102, a power supply cage 104, and switch arms 106 and 108. Power supply unit 102 includes a power connector 120 to both physically and electrically couple to a power board of an information handling system, such as information handling system 1400 of FIG. 14. Power supply cage 104 includes a top panel 130 and side panels 132 and 134. Top panel 130 includes multiple holes 140, 142, 144, and 146 to interface with portions of switch arms 106 and 108 as will be described herein. Switch arm 106 includes a switch portion 150, an arm portion 152, and a stopper portion 154. Switch arm 108 includes a switch portion 160, an arm portion 162, a stopper portion 164, and raised arm section 166. Power supply system 100 may include additional components without varying from the scope of this disclosure.

Figure 14:
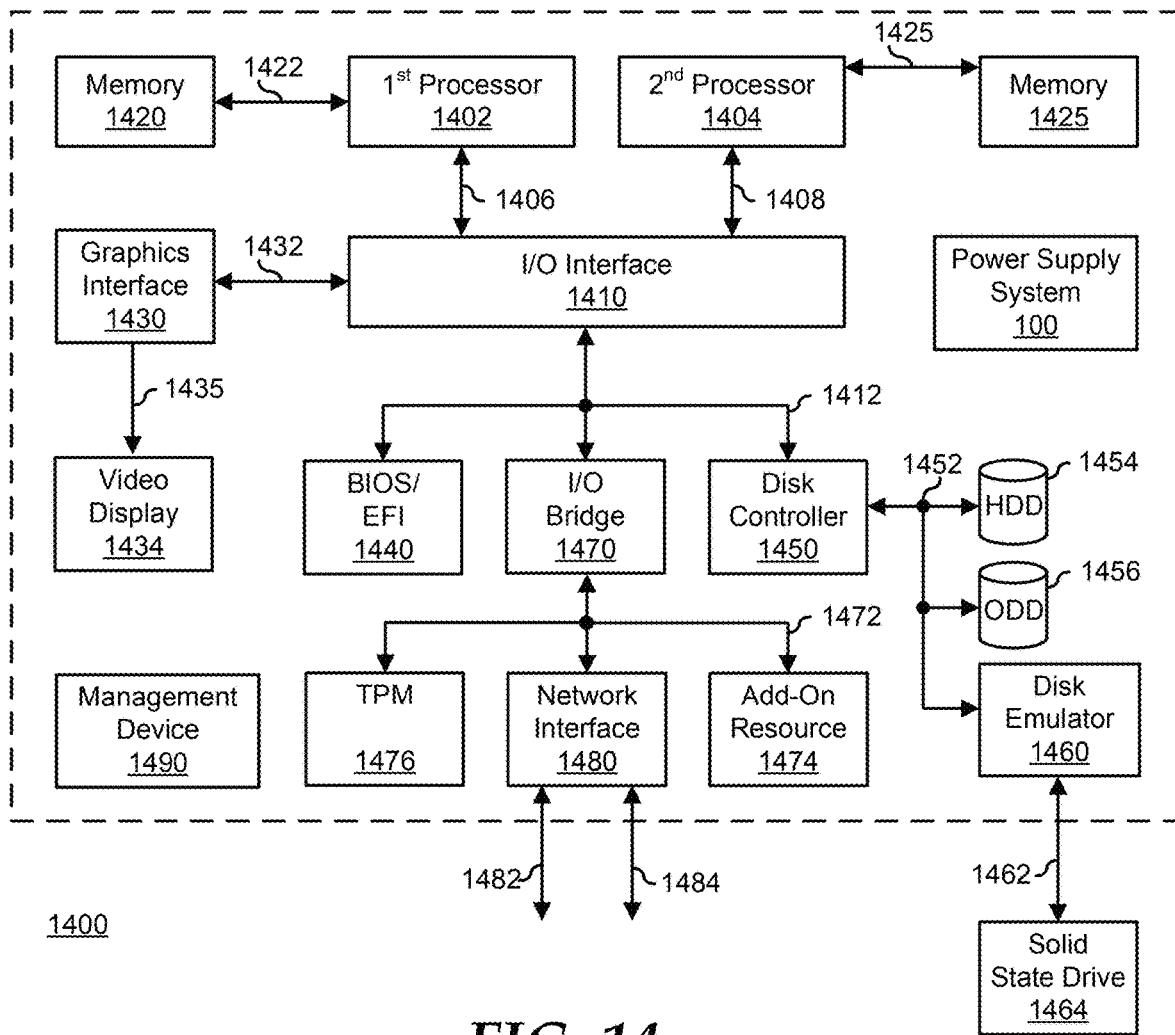
FIG. 14 is a block diagram of a general information handling system according to an embodiment of the present disclosure.

In an example, power supply cage 104 may be mounted within an information handling system or server, such as information handling system 1400 of FIG. 14. Power supply cage 104 may be a wide cage, such that power supply units with a wide width may slide within the power supply cage and properly align with connector pins within the information handling system, such as information handling system 1400 of FIG. 14. In certain examples, different configurations of power supply unit 102 may have different widths. For example, power supply unit 102 may have a wide width, a narrow width, or the like. In previous power supply cages, if a power supply unit with a narrow width is inserted within a wide power supply cage, the connection pins of the power supply unit may cross connect with the pins of the information handling system and cause a short circuit. Power supply cage 104 is improved by switch arms 106 and 108 preventing misalignment and cross connections between the connector pins 120 of power supply unit 102 and connector pins of an information handling system, such as connector pins 1401 of FIG. 14.

In certain examples, switch arms 106 and 108 may independently transition between a closed position and an open position. When switch arm 106 is in the closed position arm portion 152 is in physical communication with top panel 130 and stopper portion 154 inserted through hole 140. Similarly, when switch arm 108 is in the closed position arm portion 162 is in physical communication with top panel 130, raised arm section 166 extends over arm portion 152, and stopper portion 164 inserted through hole 142.

Referring to FIG. 2, when switch arm 106 is in the open position arm portion 152 is lifted away from top panel 130 and stopper portion 154 positioned above hole 140. In an example, if switch arm 106 is in the open position arm portion 152 and switch arm 108 is in the closed position, arm portion 152 may rise up within raised arm section 166 without coming in physical communication with the raised section. In this example, raised arm section 166 of switch arm 108 may enable switch arm 106 to be placed in the open position while switch arm 108 remains in the closed position. In an example, when switch arm 108 is in the open position arm portion 162 is lifted away from top panel 130 and stopper portion 164 positioned above hole 142.

Figure 3:
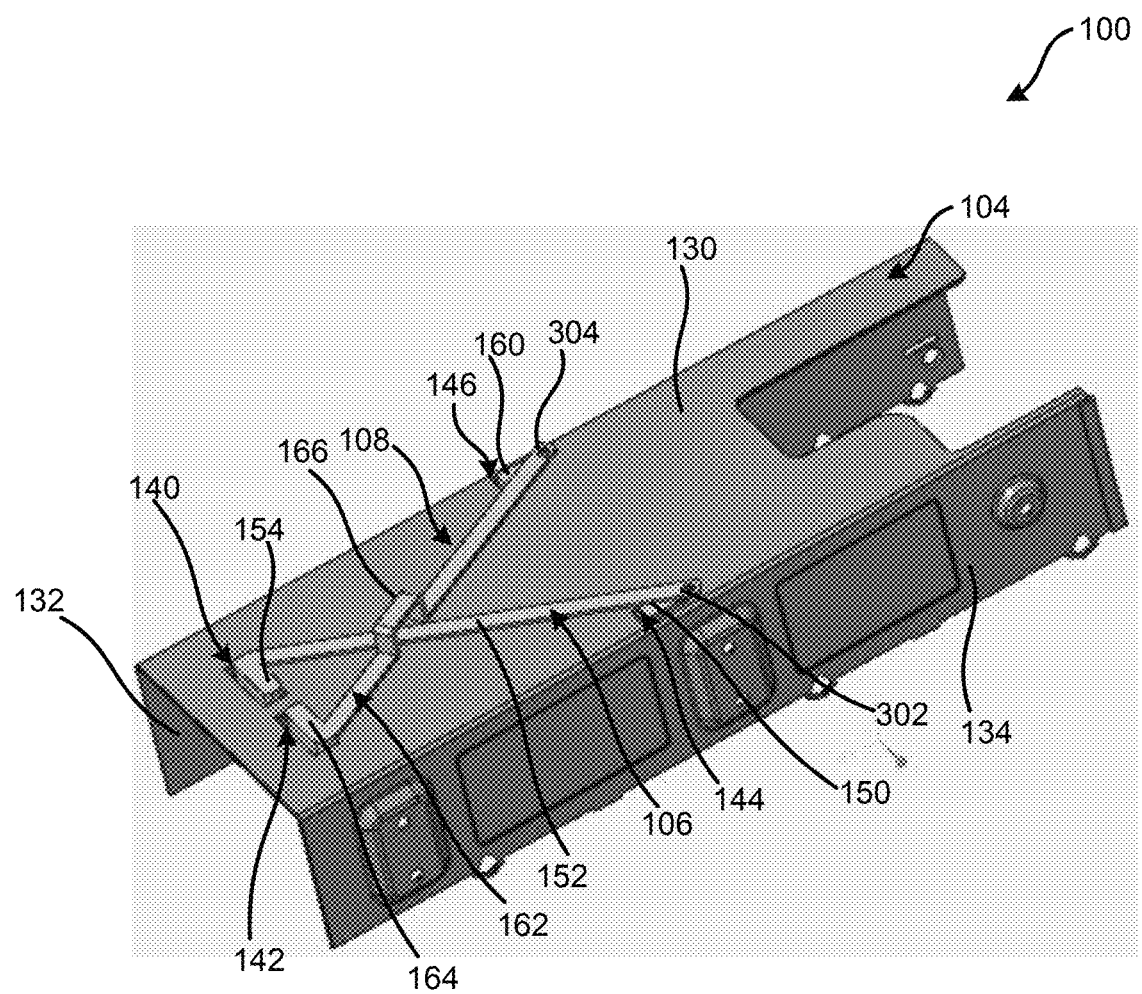
FIG. 3 is perspective view of a power supply cage for a power supply system according to at least one embodiment of the current disclosure.

FIG. 3 illustrates a portion of power supply system 100 including flex pins 302 and power supply cage 104 according to at least one embodiment of the current disclosure. Flex pin 302 is in physical communication with both switch arm 106 and top panel 130. Flex pin 304 is in physical communication with both switch arm 108 and top panel 130. Power supply system 100 may include additional components without varying from the scope of this disclosure.

In certain examples, flex pin 302 may securely attach switch arm 106 to top panel 130. For example, flex pin 302 may extend through one end of arm portion 152 of switch arm 106 and through top panel to hold this end of the switch arm in physical communication with the top panel. When switch arm 106 is in the open position, stopper portion 154 and most of arm portion 152 is no longer in physical communication with top panel 130, but the end of arm portion connected to flex pin 302 may continue to be in physical communication with the top panel. In certain examples, flex pin 302 may bias switch arm 106 toward the closed position. For example, flex pin 302 exert a force on arm portion 152, and the force may cause the switch arm to be biased toward closed position.

In an example, flex pin 304 may securely attach switch arm 108 to top panel 130. For example, flex pin 304 may extend through one end of arm portion 162 of switch arm 108 and through top panel to hold this end of the switch arm in physical communication with the top panel. When switch arm 108 is in the open position stopper portion 164 and most of arm portion 162 is no longer in physical communication with top panel 130, but the end of arm portion connected to flex pin 304 may continue to be in physical communication with the top panel. In certain examples, flex pin 304 may bias switch arm 108 toward the closed position. For example, flex pin 304 exert a force on arm portion 162, and the force may cause the switch arm to be biased toward closed position.

Figure 4:
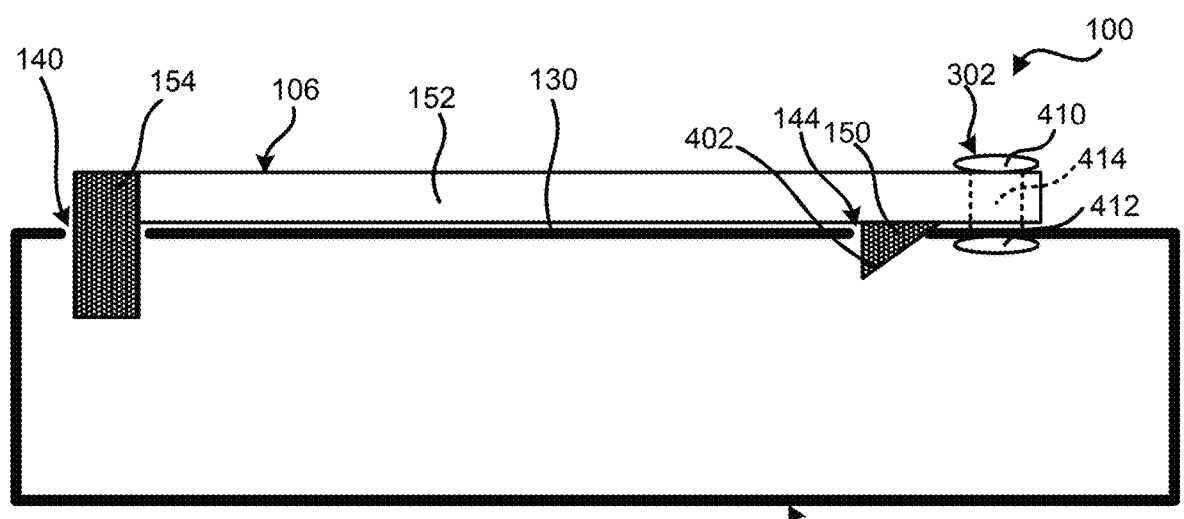
FIG. 4 is a cross-sectional view of a portion of a power supply system with a switch arm in a closed position according to at least one embodiment of the current disclosure.

FIG. 4 illustrates a portion of a power supply system 100 with switch arm 106 in the closed position according to at least one embodiment of the current disclosure. Switch portion 150 of switch arm 106 includes a slope 402. Flex pin 302 includes caps 410 and 412, and a tube portion 414. Cap 410 of flex pin 302 is in physical communication with a top surface of switch arm 106, tube portion 414 extend through arm portion 152 of the switch arm and top panel 130, and cap 412 is in physical communication with an inner surface of the top panel. While a gap is illustrated between switch arm 106 and top panel 130 to show the different components, the switch arm 106 and top panel 130 are in physical communication with each other.

As illustrated in FIG. 4, while switch arm 152 is in the closed position, stopper 154 is inserted through hole 140 and a large amount of the stopper extends into a cavity of power supply cage 104. While a description of a flex pin is made herein with respect to flex pin 302, caps 410 and 412, and tube portion 414, the description of the flex pin 302 may similarly apply to flex pin 304. For example, flex pin 304 may similarly include two caps and a tube portion which may interface with switch arm 108 and top portion 130 in substantially the same manner as flex pin 304 with switch arm 106 and the top portion. For clarity and brevity, the description of flex pins 302 and 304 will be described only with respect to flex pin 302.

In certain examples, cap 410 of flex pin 304 may exert a force on arm portion 152 of switch arm 106 and cap 412 may exert a force on the inner surface of top panel 130. In an example, the force exerted by cap 410 on arm portion 152 may be in a substantially opposite direction as the force by cap 412 on the inner surface of top panel 130. These forces may bias switch arm 108 toward the closed position by pushing the switch arm toward an outer surface of top panel 130 and biasing towards physical communication with the top panel. In certain examples, the outer surface of tube portion 414 may be any suitable shape, including but not limited to, a circle, a square, a hexagon, or the like.

Figure 5:
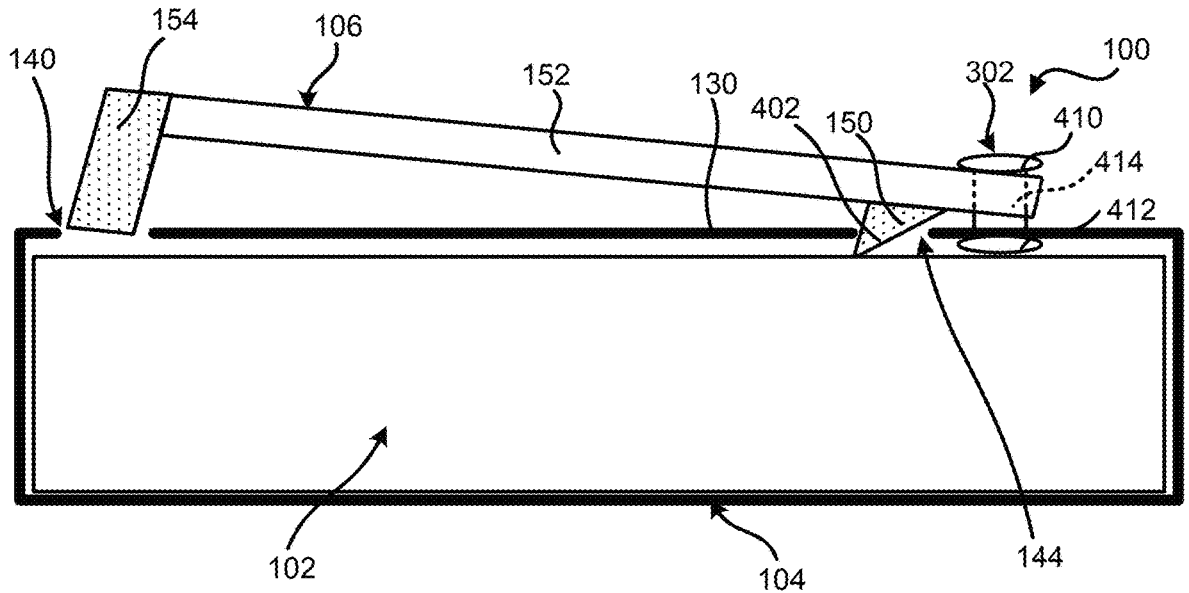
FIG. 5 is a cross-sectional view of a portion of a power supply system with a switch arm in an open position according to at least one embodiment of the current disclosure.

FIG. 5 illustrates a portion of power supply system 100 with switch arm 106 in the open position according to at least one embodiment of the current disclosure. In an example, power supply unit 102 may be a wide power supply unit. In this example, when power supply unit 102 is inserted within power supply cage 104, the power supply unit may interface with slope portion 402 of switch 150. In an example, when wide power supply unit 102 is inserted within power supply cage 104, the power supply unit may also interface with a slope of another switch arm, such as a slope 1302 of switch portion 160 of switch arm 108 illustrated in FIG. 13. In certain examples, slope 1302 of FIG. 13 may interface with a wide power supply unit in substantially the same manner as slope 402 described herein.

In an example, the insertion of power supply unit 102 into power supply cage 104 may cause the power supply unit to exert a force on slope 402 of switch portion 150. In response to the force, switch portion 106 may move or transition from a closed position to an open position. In certain examples, when in the open position, switch portion 150 may move with respect to hole 144, such that a substantial portion of the switch portion extends outside power supply cage 104. In an example, the movement of switch portion 150 may cause arm portion 152 to exert a force again cap 410 of flex pin 302. In this example, the force against cap 410 may cause any combination of cap 410, cap 412, and tube portion 414 to flex in a direction that may enable arm portion 152 to move away from top panel 130. While a space is illustrated in FIG. 5 between an end of arm portion 152, near hole 144, and top panel 130, flex pin 302 may cause this end of the arm portion to stay in physical communication with the outer surface of the top panel. In an example, a hole within arm portion 152 may be larger than the circumference or perimeter of tube portion 414 to enable movement of switch arm 106 from the closed position to the open position. In another example, the hole within arm portion 152 may be the same size as or slightly larger than the circumference or perimeter of tube portion 414. In this example, the relatively same size of the hole in arm portion 152 and tube portion 414 may cause the tube portion to flex while arm switch 106 transitions from the closed position to the open position and also remain flexed while the arm switch in the open position.

In an example, the movement of switch portion 150 may exert a force on arm portion 152, which may cause the arm portion and stopper portion 154 to respectively move away from top panel 130 and hole 140. Based on stopper portion 154 moving outside of power supply cage 104, one end of wide power supply unit 102 may slide beyond the stopper portion within the power supply cage. In an example, wide power supply unit 102 may be in a fully inserted position when one end of the wide power supply unit is past stopper portion 154 and the wide power supply unit physically and electrically interfaces with a connector of an information handling system, such as connectors 1401 of information handling system 1440 of FIG. 14.

Figure 6:
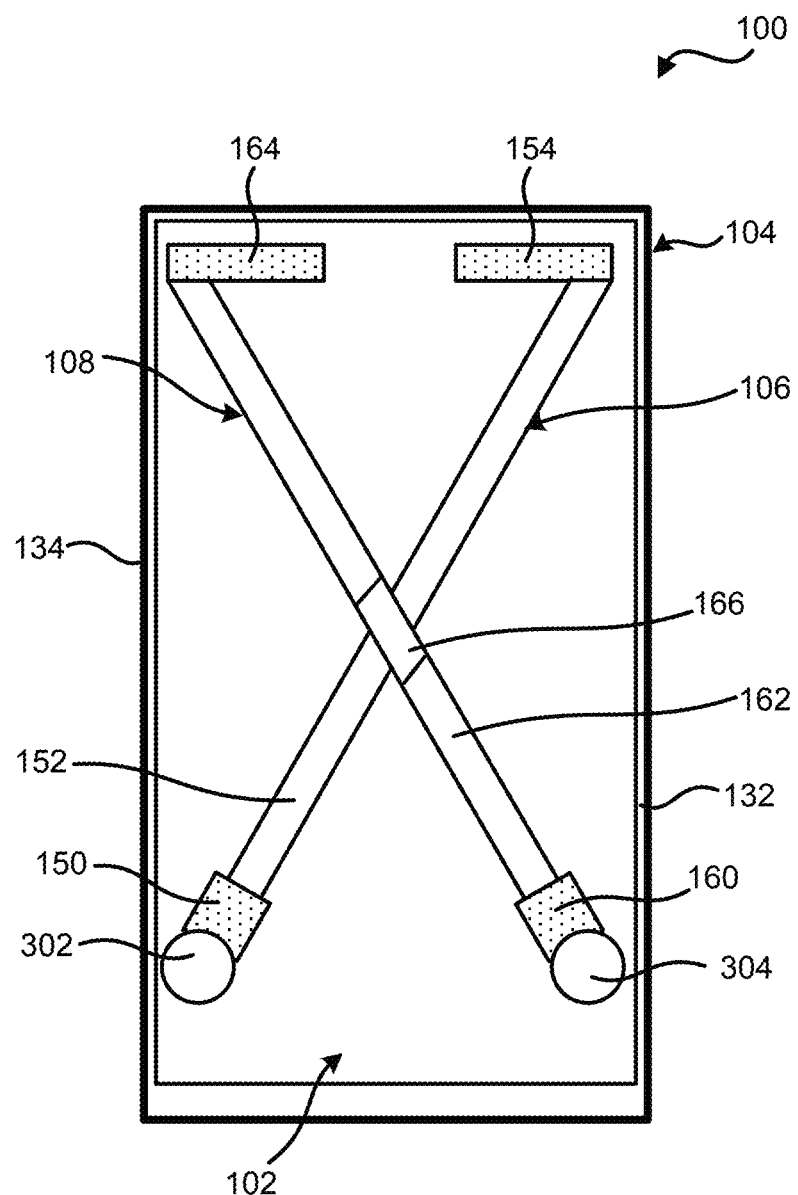
FIG. 6 is a top view of a power supply system with two switch arms in an open position according to at least one embodiment of the current disclosure.

FIG. 6 illustrates a portion of power supply system 100 according to at least one embodiment of the current disclosure. Power supply system 100 includes wide power supply unit 102, power supply cage 104, switch arms 106 and 108, and flex pins 302 and 304. Switch arm 106 includes switch portion 150, arm portion 152 and stopper portion 154. Switch arm 108 includes switch portion 160, arm portion 162 and stopper portion 162.

As illustrated in FIG. 6, flex pin 302 and switch portion 150 of switch arm 106 is located near one edge of top panel 130, such as near the intersection of the top panel and side panel 134. Stopper portion 154 of switch arm 106 is located near the other edge of top panel 130, such as near the intersection of the top panel and side panel 132. In this example, arm portion 152 may extend diagonally across top panel 130 from switch portion 150 and flex pin 302 to stopper portion 154 at the opposite or distal end of the arm portion.

In an example, flex pin 304 and switch portion 160 of switch arm 108 is located near one edge of top panel 130, such as near the intersection of the top panel and side panel 132. Stopper portion 164 of switch arm 108 is located near the other edge of top panel 130, such as near the intersection of the top panel and side panel 134. In this example, arm portion 162 may extend diagonally across top panel 130 from switch portion 160 and flex pin 304 to stopper portion 164 at the opposite or distal end of the arm portion. In certain examples, raised arm portion 166 of switch arm 108 may be extended above arm portion 152 of switch arm 106, such that the switch arm 106 may be located in the open position while switch arm 108 is in the closed position.

Figure 11:
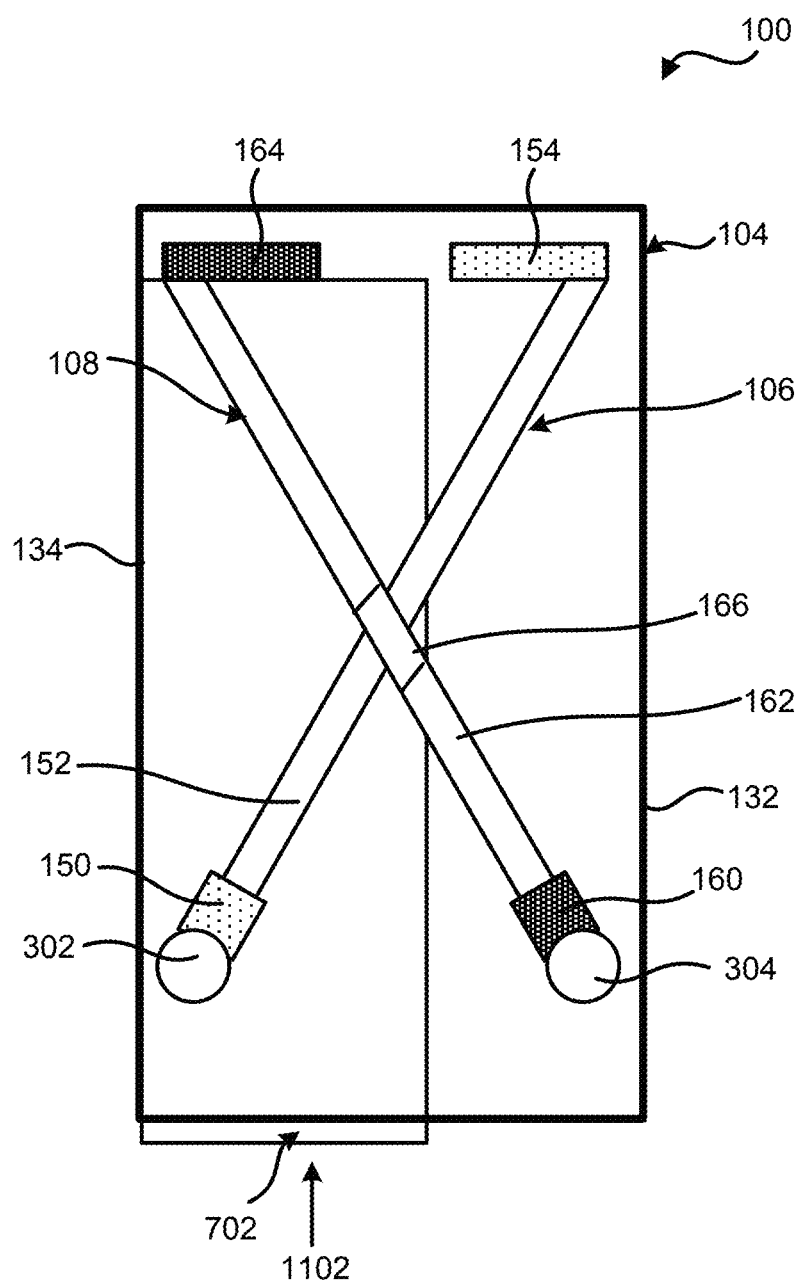
FIG. 11 is a top view of a power supply system with one switch arm in a closed position according to at least one embodiment of the current disclosure.

The position of switch arms 106 and 108 will be illustrated by the shading of respective switch portions 150 and 160 and respective stopper portions 154 and 164. For example, switch arm 106 is in the open position when switch portion 150 and stopper portion 154 have a lighter shade, as illustrated in FIG. 6, and the switch arm is in the closed position when the switch portion and the stopper portion have a darker shade as illustrated in FIG. 11. Similarly, switch arm 108 is in the open position when switch portion 160 and stopper portion 164 have a lighter shade, as illustrated in FIG. 6, and the switch arm is in the closed position when the switch portion and the stopper portion have a darker shade as illustrated in FIG. 11.

As illustrated in FIG. 6, the edges of wide power supply unit 102 may extend beyond switch portions 150 and 160, as well as respective stopper portions 154 and 164. In an example, as wide power supply unit 102 is inserted within power supply cage 104, the power supply unit may interface with switch portions 150 and 160, which in turn may cause respective switch arms 106 and 108 to transition from the closed position to the open position. In certain examples, the transition of switch arms 106 and 108 from the closed position to the open position may be in substantially similar manner as described above with respect to switch arm 106 in FIG. 5.

Figure 7:
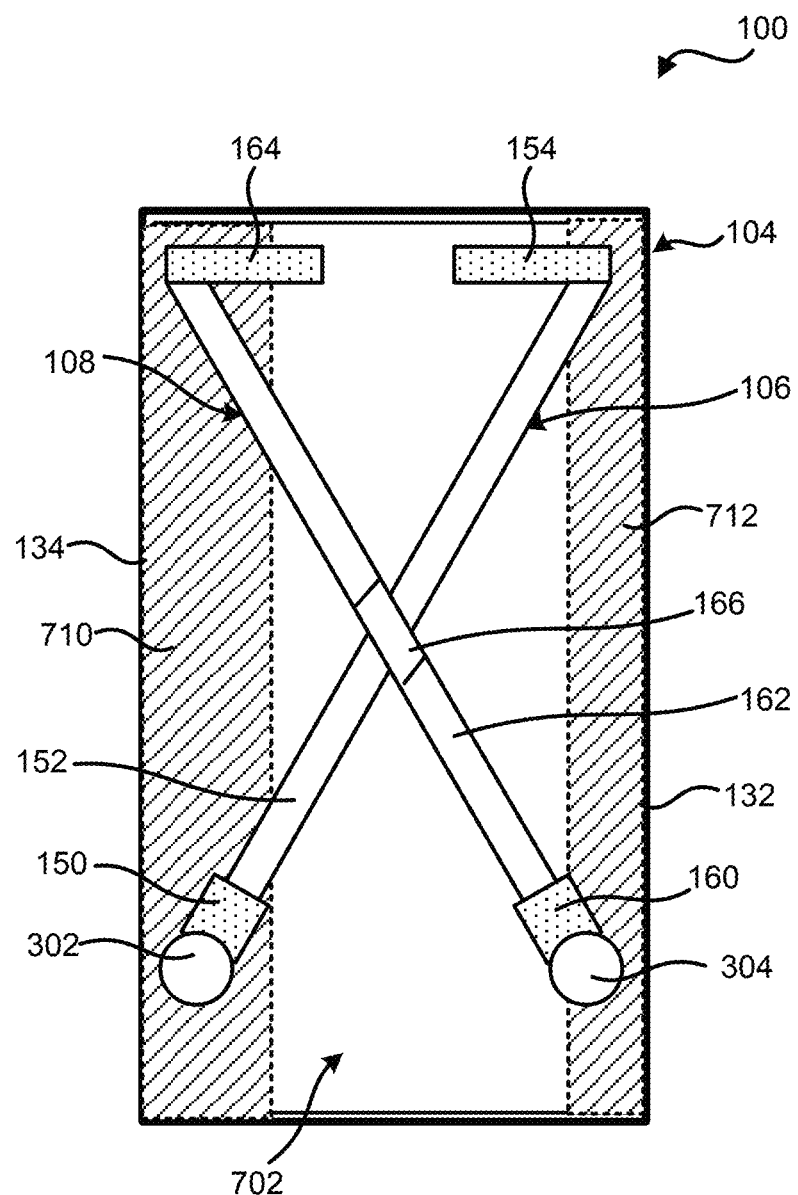
FIG. 7 is a top view of a power supply system with two fillers and with two switch arms in an open position according to at least one embodiment of the current disclosure.

FIG. 7 illustrates a portion of power supply system 100 with a narrow power supply unit 702 and fillers 710 and 712 according to at least one embodiment of the current disclosure. Filler 710 may be located within power supply cage 104 and in physical communication with side panel 134, and filler 712 may be located within the power supply cage and in physical communication with side panel 132. In an example, fillers 710 and 712 may extend the entire length of power supply cage 104 as illustrated in FIG. 7.

In certain examples, filler 710 may interface with switch portion 150 such that switch arm 106 is placed in the open position, as indicated by the light shading of the switch portion and stopper portion 154. Similarly, filler 712 may interface with switch portion 160 such that switch arm 108 is placed in the open position, as indicated by the light shading of the switch portion and stopper portion 164. Based on switch arms 106 and 108 being in the open position, narrow power supply unit 702 may be inserted beyond stopper portions 154 and 164. In this example, the connection pins of narrow power supply unit 702 may interface physically and electrically with connector pins of an information handling system, such as connector pins 1401 of information handling system 1400 of FIG. 4. In an example, the widths of fillers 710 and 712 may cause the proper alignment of narrow power supply unit 702 within power supply cage 104. In this example, the alignment of narrow power supply unit 702 caused by fillers 710 and 712 may ensure proper alignment and connection between the connector pins of power supply unit 702 and connector pins of an information handling system, such as connector pins 1401 of FIG. 14.

Figure 8:
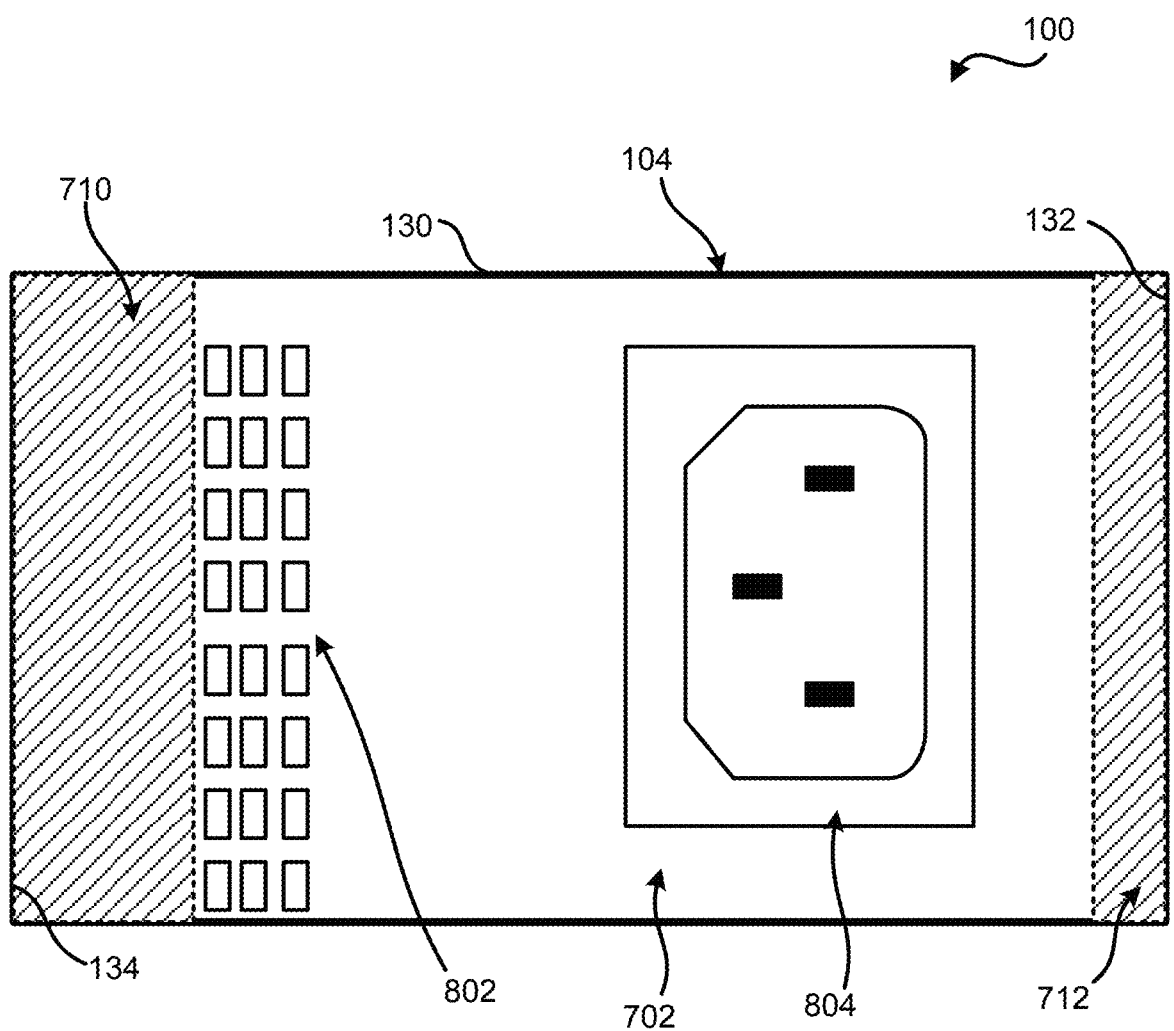
FIG. 8 is a back view of a power supply system with two fillers according to at least one embodiment of the current disclosure.

FIG. 8 illustrates a portion of power supply system 100 including air vents 802 and alternating current (AC) connector 804 of power supply unit 702 according to at least one embodiment of the current disclosure. Filler 710 may be in physical communication with top panel 130 and side panel 134 of power cage 104, and filler 712 may be in physical communication with top panel 130 and side panel 132. In an example, air vents 802 may provide cooling air flow within power supply unit 702 to prevent over-heating of the components within the power supply unit. In certain examples, AC connector 804 may interface with an AC power cord to connect power supply unit 702 with an AC power source. Power supply unit 702 may convert the AC power received at AC connector 804 into proper power levels for different components within an information handling system, such as the components within information handling system 1400 of FIG. 14.

Figure 9:
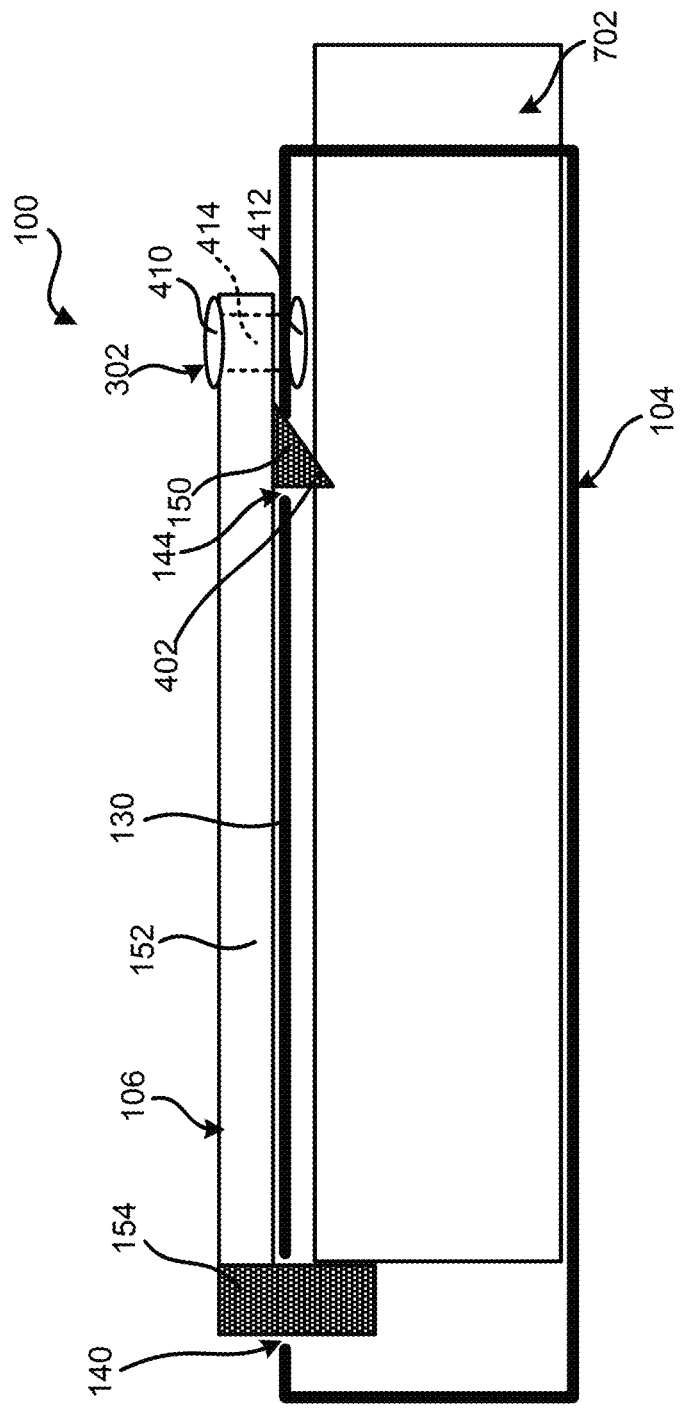
FIG. 9 is a cross-sectional view of a portion of a power supply system with a switch arm in a closed position according to at least one embodiment of the current disclosure.

FIG. 9 illustrates a portion of power supply system 100 with narrow power supply unit 702 inserted within power supply cage 104 according to at least one embodiment of the current disclosure. When narrow power supply unit 702 is inserted within power supply cage 104 without fillers 710 and 712 of FIG. 7, the narrow power supply unit 702 may not interface with slope 402 of switch portion 150. In this example, narrow power supply 702 may not exert a force on slope 402, such that switch arm 106 may remain in the closed position. For example, without switch portion 150 exerting an additional force on arm portion 152, caps 410 and 412 and tube portion 414 of flex pin 302 may continue to bias switch arm 106 in the closed position.

While switch arm 106 is in the closed position, switch portion 150 is extended through hole 144 into power supply cage 104 and stopper portion 154 is extended through hole 140 into power supply cage 104. Based on stopper portion 154 extending within power supply cage 104, narrow power supply unit 702 may be placed in physical communication with stopper portion 154. This physical communication between power supply unit 702 and stopper portion 154 may prevent the narrow power supply from being fully inserted within power supply cage 104 and prevent an interface between the connector pins of the narrow power supply unit and connector pins of an information handling system, such as connector pins 1401 of information handling system 1400 in FIG. 14.

Figure 10:
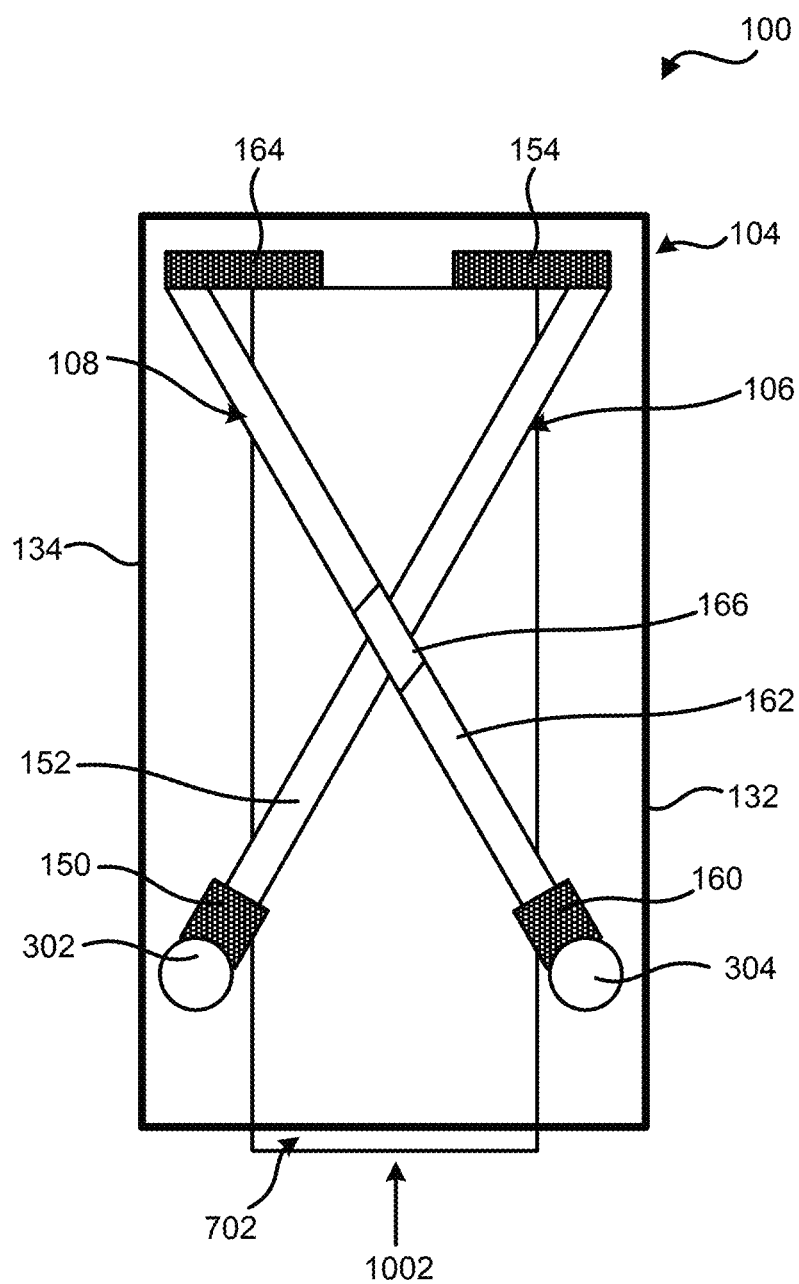
FIG. 10 is a top view of a power supply system with two switch arms in a closed position according to at least one embodiment of the current disclosure.
Figure 12:
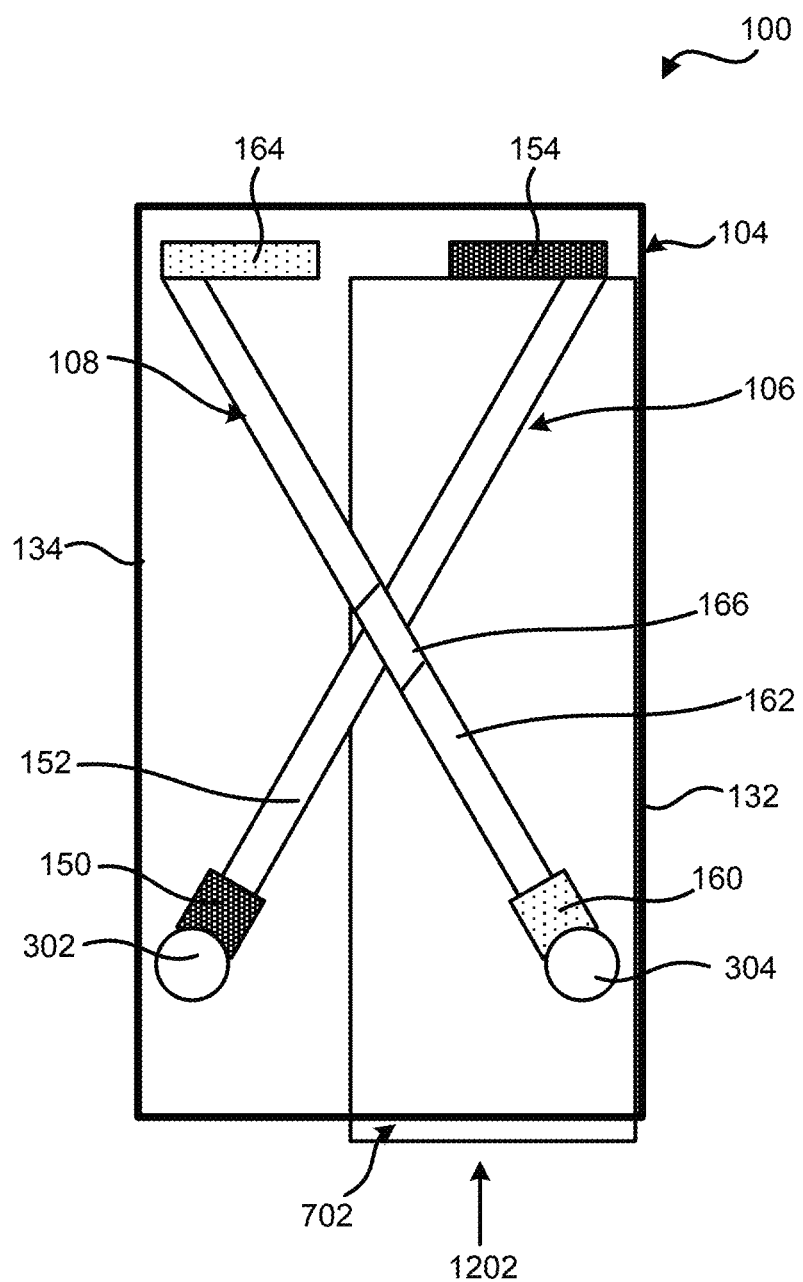
FIG. 12 is a top view of a power supply system with the other switch arm in a closed position according to at least one embodiment of the current disclosure.

FIGS. 10, 11, and 12 illustrate a portion of power supply system 100 according to at least one embodiment of the current disclosure. Power supply system 100 includes narrow power supply unit 702, power supply cage 104, switch arms 106 and 108, and flex pins 302 and 304. Switch arm 106 includes switch portion 150, arm portion 152 and stopper portion 154. Switch arm 108 includes switch portion 160, arm portion 162 and stopper portion 162.

As illustrated in FIGS. 10-12, flex pin 302 and switch portion 150 of switch arm 106 is located near one edge of top panel 130, such as near the intersection of the top panel and side panel 134. Stopper portion 154 of switch arm 106 is located near the other edge of top panel 130, such as near the intersection of the top panel and side panel 132. In this example, arm portion 152 may extend diagonally across top panel 130 from switch portion 150 and flex pin 302 to stopper portion 154 at the opposite or distal end of the arm portion.

In an example, flex pin 304 and switch portion 160 of switch arm 108 is located near one edge of top panel 130, such as near the intersection of the top panel and side panel 132. Stopper portion 164 of switch arm 108 is located near the other edge of top panel 130, such as near the intersection of the top panel and side panel 134. In this example, arm portion 162 may extend diagonally across top panel 130 from switch portion 160 and flex pin 304 to stopper portion 164 at the opposite or distal end of the arm portion. In certain examples, raised arm portion 166 of switch arm 108 may be extended above arm portion 152 of switch arm 106, such that the switch arm 106 may be located in the open position while switch arm 108 is in the closed position.

Figure 13:
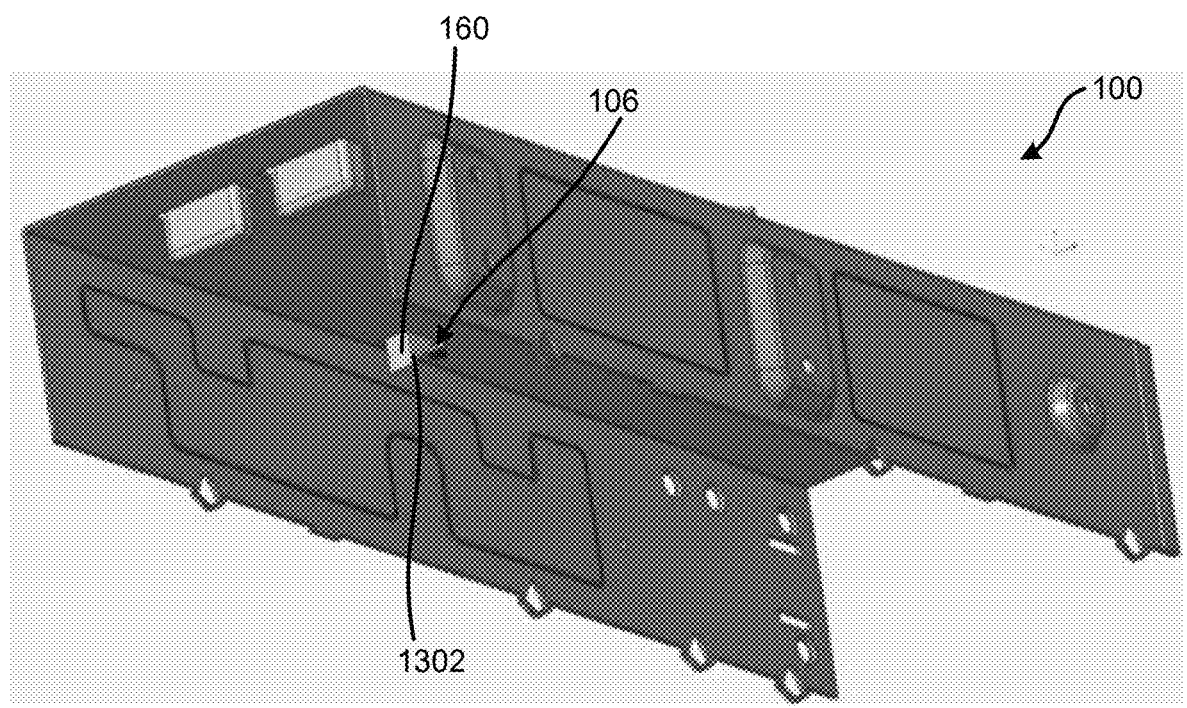
FIG. 13 is a perspective view of a power supply cage for a power supply system according to at least one embodiment of the current disclosure.

Referring now to FIG. 10, narrow power supply unit 702 may be inserted into power supply cage 104 in the direction of arrow 1002. In this example, narrow power supply unit 702 may be positioned in between switch portions 150 and 160. Based on the position of narrow power supply unit 702, the narrow power supply unit may not interface with slope 402 of switch portion 150 as illustrated in FIG. 4 and may not interface with slope 1302 of switch portion 160 as illustrated in FIG. 13.

Based on narrow power supply unit 702 not interfacing with either of switch portions 150 and 160, both switch arms 106 and 108 may remain in the closed position. In an example, switch arm 106 is illustrated as being in the closed position based on switch portion 150 and stopper portion 154 both having dark shading. Similarly, switch arm 108 is illustrated as being in the closed position based on switch portion 160 and stopper portion 164 both having dark shading. While switch arms 106 and 108 are in the closed position, narrow power supply unit 702 may be placed in physical communication with both of stopper portions 154 and 164. This physical communication between power supply unit 702 and stopper portions 154 and 164 may prevent the narrow power supply from being fully inserted within power supply cage 104 and prevent an interface between the connector pins of the narrow power supply unit and connector pins of an information handling system, such as connector pins 1401 of information handling system 1400 in FIG. 14.

Referring now to FIG. 11, narrow power supply unit 702 may be inserted into power supply cage 104 in the direction of arrow 1102. In this example, narrow power supply unit 702 may be positioned within power supply cage 104 alongside panel 134. Based on the position of narrow power supply unit 702, the narrow power supply unit may interface with a slope of switch portion 150, such as slope 402 illustrated in FIG. 4.

Based on narrow power supply unit 702 interfacing with switch portion 150, switch arm 106 may transition to the open position, such that stopper portion 154 may move out of power supply cage 104. However, switch arm 108 may remain in the closed position, such that switch portion 160 and stopper portion 164 extend into power supply cage 104. In an example, switch arm 106 is illustrated as being in the open position based on switch portion 150 and stopper portion 154 both having light shading. Alternatively, switch arm 108 is illustrated as being in the closed position based on switch portion 160 and stopper portion 164 both having dark shading.

While switch arm 108 is still in the closed position, narrow power supply unit 702 may be placed in physical communication with stopper portions 164. This physical communication between power supply unit 702 and stopper portion 164 may prevent the narrow power supply from being fully inserted within power supply cage 104 and prevent an interface between the connector pins of the narrow power supply unit and connector pins of an information handling system, such as connector pins 1401 of information handling system 1400 in FIG. 14. Thus, based on switch portion 150 being along one edge of top panel 130 and stopper portion 154 being located near an opposite edge of the top panel, narrow power supply unit 702 may not be fully inserted within power supply cage 104 even when the interface between switch portion 150 and the narrow power supply unit transitions switch arm 106 to the open position.

Referring now to FIG. 12, narrow power supply unit 702 may be inserted into power supply cage 104 in the direction of arrow 1202. In this example, narrow power supply unit 702 may be positioned within power supply cage 104 alongside panel 132. Based on the position of narrow power supply unit 702, the narrow power supply unit may interface with a slope of switch portion 160, such as slope 1302 illustrated in FIG. 13.

Based on narrow power supply unit 702 interfacing with switch portion 160, switch arm 108 may transition to the open position, such that stopper portion 164 may move out of power supply cage 104. However, switch arm 106 may remain in the closed position, such that switch portion 150 and stopper portion 154 extend into power supply cage 104. In an example, switch arm 108 is illustrated as being in the open position based on switch portion 160 and stopper portion 164 both having light shading. Alternatively, switch arm 106 is illustrated as being in the closed position based on switch portion 150 and stopper portion 154 both having dark shading.

While switch arm 106 is still in the closed position, narrow power supply unit 702 may be placed in physical communication with stopper portions 154. This physical communication between power supply unit 702 and stopper portion 154 may prevent the narrow power supply from being fully inserted within power supply cage 104 and prevent an interface between the connector pins of the narrow power supply unit and connector pins of an information handling system, such as connector pins 1401 of information handling system 1400 in FIG. 14. Thus, based on switch portion 160 being along one edge of top panel 130 and stopper portion 164 being located near an opposite edge of the top panel, narrow power supply unit 702 may not be fully inserted within power supply cage 104 even when the interface between switch portion 160 and the narrow power supply unit transitions switch arm 108 to the open position.

FIG. 14 shows a generalized embodiment of an information handling system 1400 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 1400 can include processing resources for executing machine-executable code, such as a central processing unit (CPU), a programmable logic array (PLA), an embedded device such as a System-on-a-Chip (SoC), or other control logic hardware. Information handling system 1400 can also include one or more computer-readable medium for storing machine-executable code, such as software or data. Additional components of information handling system 1400 can include one or more storage devices that can store machine-executable code, one or more communications ports for communicating with external devices, and various input and output (I/O) devices, such as a keyboard, a mouse, and a video display. Information handling system 1400 can also include one or more buses operable to transmit information between the various hardware components.

Information handling system 1400 can include devices or modules that embody one or more of the devices or modules described below and operates to perform one or more of the methods described below. Information handling system 1400 includes power connector pins 1401, a processors 1402 and 1404, an input/output (I/O) interface 1410, memories 1420 and 1425, a graphics interface 1430, a basic input and output system/universal extensible firmware interface (BIOS/UEFI) module 1440, a disk controller 1450, a hard disk drive (HDD) 1454, an optical disk drive (ODD) 1456, a disk emulator 1460 connected to an external solid state drive (SSD) 1462, an I/O bridge 1470, one or more add-on resources 1474, a trusted platform module (TPM) 1476, a network interface 1480, a management device 1490, and a power supply 1495. Information handling system 1400 includes power supply system 100 of FIG. 1. Processors 1402 and 1404, I/O interface 1410, memory 1420, graphics interface 1430, BIOS/UEFI module 1440, disk controller 1450, HDD 1454, ODD 1456, disk emulator 1460, SSD 1462, I/O bridge 1470, add-on resources 1474, TPM 1476, and network interface 1480 operate together to provide a host environment of information handling system 1400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 1400.

In the host environment, processor 1402 is connected to I/O interface 1410 via processor interface 1406, and processor 1404 is connected to the I/O interface via processor interface 1408. Memory 1420 is connected to processor 1402 via a memory interface 1422. Memory 1425 is connected to processor 1404 via a memory interface 1427. Graphics interface 1430 is connected to I/O interface 1410 via a graphics interface 1432 and provides a video display output 1436 to a video display 1434. In a particular embodiment, information handling system 1400 includes separate memories that are dedicated to each of processors 1402 and 1404 via separate memory interfaces. An example of memories 1420 and 1430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 1440, disk controller 1450, and I/O bridge 1470 are connected to I/O interface 1410 via an I/O channel 1412. An example of I/O channel 1412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 1410 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 1440 includes BIOS/UEFI code operable to detect resources within information handling system 1400, to provide drivers for the resources, initialize the resources, and access the resources. BIOS/UEFI module 1440 includes code that operates to detect resources within information handling system 1400, to provide drivers for the resources, to initialize the resources, and to access the resources.

Disk controller 1450 includes a disk interface 1452 that connects the disk controller to HDD 1454, to ODD 1456, and to disk emulator 1460. An example of disk interface 1452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1460 permits SSD 1464 to be connected to information handling system 1400 via an external interface 1462. An example of external interface 1462 includes a USB interface, an IEEE 4394 (Firewire) interface, a proprietary interface, or a combination thereof. Alternatively, solid-state drive 1464 can be disposed within information handling system 1400.

I/O bridge 1470 includes a peripheral interface 1472 that connects the I/O bridge to add-on resource 1474, to TPM 1476, and to network interface 1480. Peripheral interface 1472 can be the same type of interface as I/O channel 1412 or can be a different type of interface. As such, I/O bridge 1470 extends the capacity of I/O channel 1412 when peripheral interface 1472 and the I/O channel are of the same type, and the I/O bridge translates information from a format suitable to the I/O channel to a format suitable to the peripheral channel 1472 when they are of a different type. Add-on resource 1474 can include a data storage system, an additional graphics interface, a network interface card (NIC), a sound/video processing card, another add-on resource, or a combination thereof. Add-on resource 1474 can be on a main circuit board, on separate circuit board or add-in card disposed within information handling system 1400, a device that is external to the information handling system, or a combination thereof.

Network interface 1480 represents a NIC disposed within information handling system 1400, on a main circuit board of the information handling system, integrated onto another component such as I/O interface 1410, in another suitable location, or a combination thereof. Network interface device 1480 includes network channels 1482 and 1484 that provide interfaces to devices that are external to information handling system 1400. In a particular embodiment, network channels 1482 and 1484 are of a different type than peripheral channel 1472 and network interface 1480 translates information from a format suitable to the peripheral channel to a format suitable to external devices. An example of network channels 1482 and 1484 includes InfiniBand channels, Fibre Channel channels, Gigabit Ethernet channels, proprietary channel architectures, or a combination thereof. Network channels 1482 and 1484 can be connected to external network resources (not illustrated). The network resource can include another information handling system, a data storage system, another network, a grid management system, another suitable resource, or a combination thereof.

Management device 1490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 1400. In particular, management device 1490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 1400, such as system cooling fans and power supplies. Management device 1490 can include a network connection to an external management system, and the management device can communicate with the management system to report status information for information handling system 1400, to receive BIOS/UEFI or system firmware updates, or to perform other task for managing and controlling the operation of information handling system 1400.

Management device 1490 can operate off of a separate power plane from the components of the host environment so that the management device receives power to manage information handling system 1400 when the information handling system is otherwise shut down. An example of management device 1490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 1490 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A power supply system comprising:
a power supply cage having a top panel, the top panel including first and second edges;
a first switch arm having a first switch portion located near the first edge of the top panel, a first stopper portion located near the second edge, and a first arm portion extending between the first switch portion and the first stopper portion; and
a second switch arm having a second switch portion located near the second edge, a second stopper portion located near the first edge, a second arm portion extending between the second switch portion and the second stopper portion, and a raised arm portion that overlaps the first arm portion of the first switch arm.

2. The power supply system of claim 1, further comprising a first flex pin to exert a force on the first switch arm to bias the first switch arm towards a closed position.

3. The power supply system of claim 2, wherein the first arm portion is in physical communication with an outer surface of the top panel when the first arm portion is in the closed position.

4. The power supply system of claim 2, wherein the first flex pin includes: a first cap in physical communication with the first switch arm, a second cap in physical communication with an inner surface of the top panel, and a tube portion extending through the top panel and the first switch arm.

5. The power supply system of claim 1, wherein the top panel includes a first hole, wherein the first stopper is inserted within the first hole when the first switch arm is in a closed position.

6. The power supply system of claim 5, wherein the first stopper portion is positioned outside of the power supply cage when the first switch arm is in an open position.

7. The power supply system of claim 5, the top panel includes a second hole, wherein the second stopper is inserted within the second hole when the second switch arm is in a closed position.

8. The power supply system of claim 7, wherein the second stopper portion is positioned outside of the power supply cage when the second switch arm is in an open position.

9. The power supply system of claim 1, further comprising:
first and second side panels;
a first filler in physical communication with the first side panel, the top panel, and the first switch portion, the first filler causes the first switch arm to be in an open position; and
a second filler in physical communication with the second side panel, the top panel, and the second switch portion, the second filler causes the second switch arm to be in an open position.

10. A power supply system comprising:
a power supply cage having a top panel, the top panel including first and second edges;
a power supply unit to be inserted within the power supply cage;
a first switch arm having a first switch portion located near the first edge of the top panel, a first stopper portion located near the second edge, and a first arm portion extending between the first switch portion and the first stopper portion; and
a second switch arm having a second switch portion located near the second edge, a second stopper portion located near the first edge, a second arm portion extending between the second switch portion and the second stopper portion, and a raised arm portion that overlaps the first arm portion of the first switch arm.

11. The power supply system of claim 10, further comprising a first flex pin to exert a force on the first switch arm to bias the first switch arm towards a closed position.

12. The power supply system of claim 11, wherein the first arm portion is in physical communication with an outer surface of the top panel when the first arm portion is in the closed position.

13. The power supply system of claim 11, wherein the first flex pin includes: a first cap in physical communication with the first switch arm, a second cap in physical communication with an inner surface of the top panel, and a tube portion extending through the top panel and the first switch arm.

14. The power supply system of claim 10, wherein the top panel includes a first hole, wherein the first stopper is inserted within the first hole when the first switch arm is in a closed position.

15. The power supply system of claim 14, wherein the first stopper portion is positioned outside of the power supply cage when the first switch arm is in an open position.

16. The power supply system of claim 14, the top panel includes a second hole, wherein the second stopper is inserted within the second hole when the second switch arm is in a closed position.

17. The power supply system of claim 16, wherein the second stopper portion is positioned outside of the power supply cage when the second switch arm is in an open position.

18. The power supply system of claim 10, further comprising:
first and second side panels;
a first filler in physical communication with the first side panel, the top panel, and the first switch portion, the first filler causes the first switch arm to be in an open position; and
a second filler in physical communication with the second side panel, the top panel, and the second switch portion, the second filler causes the second switch arm to be in an open position, wherein the power supply unit is fully inserted within the power supply cage when a width of the power supply unit is equal to a distance between the first and second fillers.

19. An information handling system comprising:
a processor;
connector pins to provide power to the processor; and
a power supply system in physical and electrical communication with the connector pins, the power supply system including:
a power supply cage having a top panel, the top panel includes first and second edges;
a power supply unit to be inserted within the power supply cage, the power supply unit to provide the power to the processor via the connector pins;
a first switch arm having a first switch portion located near the first edge of the top panel, a first stopper portion located near the second edge, and a first arm portion extending between the first switch portion and the first stopper portion; and
a second switch arm having a second switch portion located near the second edge, a second stopper portion located near the first edge, a second arm portion extending between the second switch portion and the second stopper portion, and a raised arm portion that overlaps the first arm portion of the first switch arm, wherein the power supply unit is fully inserted into the power supply cage when the first and second switch arms are both in an open position.

20. The information handling system of claim 19, further comprising: a first flex pin to exert a force on the first switch arm to bias the first switch arm towards a closed position.

\* \* \* \* \*